United States Patent
Guha et al.

(10) Patent No.: US 6,393,395 B1
(45) Date of Patent: May 21, 2002

(54) HANDWRITING AND SPEECH RECOGNIZER USING NEURAL NETWORK WITH SEPARATE START AND CONTINUATION OUTPUT SCORES

(75) Inventors: Angshuman Guha, Redmond; Patrick M. Haluptzok; James A. Pittman, both of Issaquah, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/227,170

(22) Filed: Jan. 7, 1999

(51) Int. Cl.[7] .......................... G10L 15/04; G06K 9/00; G06K 9/46
(52) U.S. Cl. ................. 704/232; 704/253; 704/254; 382/186; 382/187; 709/20
(58) Field of Search ................. 704/232, 254, 704/253; 382/186, 187

(56) References Cited

U.S. PATENT DOCUMENTS

| | | |
|---|---|---|
| 3,111,646 A | 11/1963 | Harmon |
| 3,127,588 A | 3/1964 | Harmon |
| 3,133,266 A | 5/1964 | Frishkopf |
| 3,969,698 A | 7/1976 | Bollinger et al. |
| 3,996,557 A | 12/1976 | Donahey |
| 4,610,025 A | 9/1986 | Blum et al. |
| 4,731,857 A | 3/1988 | Tappert |
| 4,754,489 A | 6/1988 | Bokser |
| 4,764,972 A | 8/1988 | Yoshida et al. |
| 4,918,740 A | 4/1990 | Ross |
| 4,933,977 A | 6/1990 | Ohnishi et al. |
| 4,987,603 A | 1/1991 | Ohnishi et al. |
| 5,034,989 A | 7/1991 | Loh |
| 5,052,043 A * | 9/1991 | Gaborski .................. 382/157 |

(List continued on next page.)

FOREIGN PATENT DOCUMENTS

| | | |
|---|---|---|
| EP | 0 543 590 | 5/1993 |
| EP | 0 858 047 | 8/1998 |
| WO | WO 94/07214 | 3/1994 |
| WO | WO 98/15914 | 4/1998 |

OTHER PUBLICATIONS

Ha–Jin Yu and Yung–Hwan Oh, "A Neural Network for 500 Vocabulary Word Spotting Using Acoustic Sub–Word Units", Proc. IEEE ICASSP 1997, vol. 4, pp. 3277–3280, Apr. 1997.*

(List continued on next page.)

*Primary Examiner*—Tālivaldis Ivars Šmits
(74) *Attorney, Agent, or Firm*—Michalik & Wylie, PLLC

(57) ABSTRACT

A method and system for recognizing user input information including cursive handwriting and spoken words. A time-delayed neural network having an improved architecture is trained at the word level with an improved method, which, along with preprocessing improvements, results in a recognizer with greater recognition accuracy. Preprocessing is performed on the input data and, for example, may include resampling the data with sample points based on the second derivative to focus the recognizer on areas of the input data where the slope change per time is greatest. The input data is segmented, featurized and fed to the time-delayed neural network which outputs a matrix of character scores per segment. The neural network architecture outputs a separate score for the start and the continuation of a character. A dynamic time warp (DTW) is run against dictionary words to find the most probable path through the output matrix for that word, and each word is assigned a score based on the least costly path that can be traversed through the output matrix. The word (or words) with the overall lowest score (or scores) are returned. A DTW is similarly used in training, whereby the sample ink only need be labeled at the word level.

36 Claims, 13 Drawing Sheets

U.S. PATENT DOCUMENTS

| | | | | |
|---|---|---|---|---|
| 5,313,527 | A | | 5/1994 | Guberman et al. |
| 5,440,651 | A | | 8/1995 | Martin |
| 5,442,715 | A | * | 8/1995 | Gaborski et al. ............ 382/187 |
| 5,455,892 | A | * | 10/1995 | Minot et al. .................. 706/25 |
| 5,467,407 | A | | 11/1995 | Guberman et al. |
| 5,528,728 | A | * | 6/1996 | Matsuura et al. ............ 704/232 |
| 5,568,591 | A | * | 10/1996 | Minot et al. .................. 706/25 |
| 5,764,797 | A | | 6/1998 | Adcock |
| 5,926,566 | A | * | 7/1999 | Wang et al. ................. 382/185 |
| 6,018,591 | A | * | 1/2000 | Hull et al. ................... 381/186 |

OTHER PUBLICATIONS

N.Z. Hakim, J.J. Kaufman, G. Cerf, and H.E. Meadows, "Cursive Script Online Character Recognition with a Recurrent Neural Network Model," Proc. International Joint Conference on Neural Networks, IJCNN 1992, vol. 3, pp. 711–716, Jun. 1992.*

Ehrich et al., "Experiments in the Contextual Recognition of Cursive Script," *IEEE Transactions on Computers,* V C–24, No. 2, pp. 182–194 (Feb. 1975).

Guberman et al., "Simulation of Behavior and Intelligence," *Algorithm for the Recognition of Handwritten Text,* Plenum Publishing Corporation, New York, NY, pp. 751–757 (1976).

Frishkopf et al., "Machine Reading of Cursive Script," *Information Theory,* London, Great Britain, pp. 300–316, (Aug. 29, 1960).

Kadirkamanahan et al., "A Unified Appraoch to On–Line Cursive Script Segmentation and Feature Extraction," *Multidimensional Signal Processing Audio & Electroacoustics,* vol. 3, International Conference on Acoustics, Speech and Signal Processing (ICASSP), pp. 1659–1662 (May 23–26, 1989).

Morasso et al., "Self–Organisation of an Allograph Lexicon," *International Neural Network Conference,* vol. 1, pp. 141–144 (Jul. 9–13, 1990).

Okuda et al., "A Method for the Correction of Garbled Words Based on the Levenshtein Metric," *IEEE Transactions on Computers,* vol. C–25, No. 2, pp. 172–178 (Feb. 1976.

Bengio et al., "LeRec: A NN/HMM Hybrid for On–Line Handwriting Recognition," *Nerual Computation,* vol. 7, No. 6, pp. 1289–1303 (Nov. 1995).

Shi et al., "Lexicon–Driven Handwritten Word Recognition Using Choquet Fuzzy Integrel," IEEE International Conference on Systems, Man and Cybernetics, pp. 412–417 (Oct. 1996).

Copy of International Search Report in Corresponding PCT Application No. PCT/US99/30114.

* cited by examiner

HANDWRITING AND SPEECH RECOGNIZER USING NEURAL NETWORK WITH SEPARATE START AND CONTINUATION OUTPUT SCORES

FIELD OF THE INVENTION

The invention relates generally to computer systems, and more particularly to the recognition of handwriting and speech.

BACKGROUND OF THE INVENTION

Users who attempt to input information into desktop and hand-held computers via writing or speech can experience many recognition errors. This significantly slows the rate at which information is input, and significantly frustrates users. Improved recognition accuracy is continually sought.

The accurate recognition of cursive handwriting, for example, is a formidable task. A first difficulty arises in that cursive handwriting is initially represented as large quantities of coordinate pairs coming in via a digitizer over time, which must be processed in some manner. The higher the resolution of the digitizer, the more coordinate pairs are provided. To directly recognize handwriting from the coordinate data is beyond the capabilities of ordinary computers, and thus some pre-processing needs to be done on the data to make it more manageable.

One type of recognizer is based on a time-delayed neural network. In one such recognizer, described in the publication "Recognizing Cursive Handwriting," David E. Rumelhart, Computational Learning & Cognition, Proceedings of the Third NEC Research Symposium, a neural network is trained to recognize a number of feature values representing known words. For example, two such values represent the net motions in the x and y directions, respectively, for that word. After training, when later attempting recognize a word, an unknown input word is featurized according to the criteria on which the neural network was trained, and the features therefor are fed into the neural network. The neural net outputs a probability for possible letters (a–z) in the word, and a dynamic programming procedure finds the best fitting words from a dictionary to produce a ranked ordering of words.

While the above recognition technique clearly works to an extent, tests on large numbers of samples have shown an approximately seventeen percent average error rate in recognition. This is inadequate for most user applications. Thus, while neural networked-based recognition is a promising recognition technique, improving the recognition accuracy is needed in order for practical applications to benefit therefrom.

SUMMARY OF THE INVENTION

Briefly, the present invention provides a system and method that improve the recognition accuracy of a time-delayed neural network-based handwriting or speech recognizer via an improved training method, improvements in pre-processing and an improved neural network model architecture. To recognize handwriting, in a first preprocessing step, a partitioning mechanism partitions a user's handwritten electronic ink into lines of ink, or alternatively, into proposed words. A second step (via a mechanism for implementing same) smoothes and resamples the ink to reduce any variability resulting from different writing speeds and sizes, and also eliminates jagged edges. The resampling is based on the second derivative of the ink over a particular area, which accentuates the number of points at the curves and cusps of a character as opposed to the straight portions of a character. A third step examines the smoothed ink in time order to identify delayed strokes, i.e., strokes made with dotted "i" or crossed "t" or "x" characters, which otherwise might potentially confuse the neural net. Delayed strokes are removed from the ink and recorded as feature information.

A segmenter provides a fourth step in which the recognizer process separates the ink into distinct segments based on the y-minima thereof. A featurizer implements a fifth step to featurize the segmented ink into a number of features, including Chebyschev coefficients, size and other stroke related information. A sixth step then runs the features for each segment, including the delayed stroke feature information, through a time delayed neural network.

The time-delayed neural network records the output in an x-y matrix, where the x-axis represents the strokes over time and the y-axis represents letter output scores assigned by the neural network for each letter. The improved architecture of the time-delayed neural network of the present invention outputs a separate score for whether a character is starting or continuing. In a seventh step, for every word or phrase generated from a trie structured dictionary and language model, a dynamic time warp (DTW) is run to find the most probable path through the output matrix for that word or phrase. Words or phrases are assigned a score based on the least costly path that can be traversed through the output matrix, and based on the assigned scores, the best words or phrases are returned from the recognizer. Note that as used herein the term phrase is intended to mean any plurality of words, whether they constitute a grammatically proper phrase, a complete sentence, or just any set of words not necessarily associated with one another.

A recognizer training method is also provided, the method using data labeled only at the word or phrase level. In general, the method enforces the correct number of letters and the correct order of the letters to be learned at the network train time. To this end, the neural network is started with initially random weights, and for each word or phrase input during training, the ink is featurized as described above and run through the neural network at that point. The label for the word is known, whereby a DTW matrix for that word is computed as at recognition time, recording the path backwards taken at each matrix cell. The cell in the upper-right corner of the matrix is then followed backwards to find the optimal path, setting a target of one for every network output that corresponds to the path, and a zero everywhere else.

Speech recognition based on phoneme information instead of stroke information may also employ the recognition steps, improved neural network architecture and the training method of the present invention to increase recognition accuracy.

Other advantages will become apparent from the following detailed description when taken in conjunction with the drawings, in which:

DETAILED DESCRIPTION OF THE INVENTION

Exemplary Operating Environment

Figure 1:
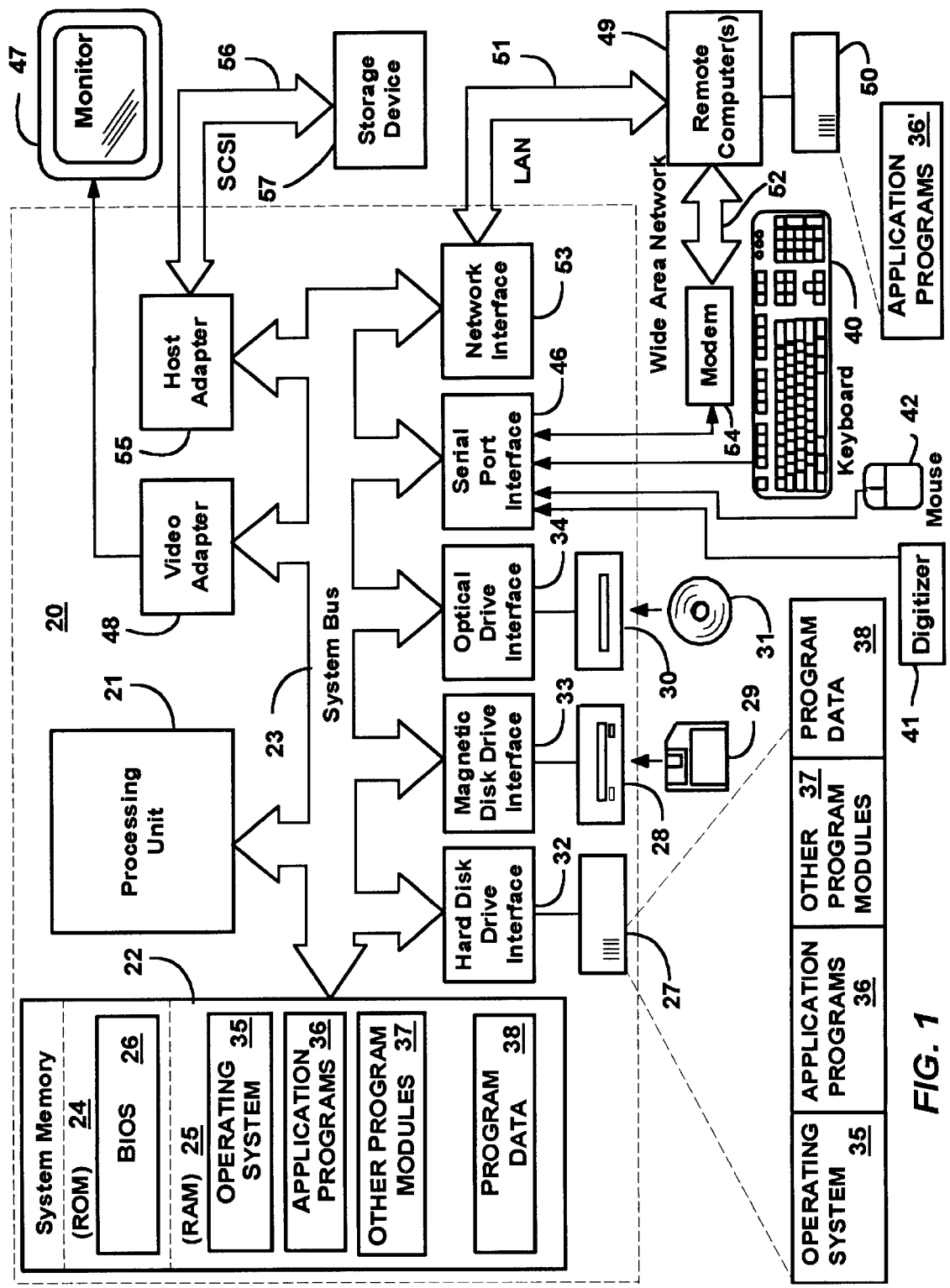
FIG. 1 is a block diagram representing a computer system into which the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a personal computer. Generally, program modules include routines, programs, objects, components, data structures and the like that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (such as Windows® 2000 or Windows® CE), one or more application programs 36, other program modules 37 and program data 38. A user may enter commands and information into the personal computer 20 through input devices such as a keyboard 40, digitizer 41 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Cursive Handwriting Recognition

In general, the present invention significantly improves the rate of recognition accuracy for cursive handwriting. As will be understood, however, since the present invention is directed to recognizing information input over time, the present invention is also applicable to speech recognition. For example, cursive handwriting may be converted to digitized x-y coordinates, where the x-coordinate generally increases with time. Similarly, speech may be converted to digitized sound information by sampling the speech over time, i.e., words comprise audio information that moves forward in time (ordinarily the positive-x direction). As such, although the invention is described primarily with reference to the recognition of handwritten information, it is understood that the present invention is generally applicable to the recognition of information input over time, including speech information. Notwithstanding, for purposes of simplicity and readability, the invention primarily will be described with respect to handwriting recognition, except where otherwise noted. Moreover, although the present invention is capable of recognizing words or phrases, it is understood that it may also recognize a set of one or more alphanumeric symbols that do not necessarily form a "word." As used herein, the term "word" may mean any grouping of one or more symbols or characters, for example, a group of numbers combined into a postal code.

Figure 2:
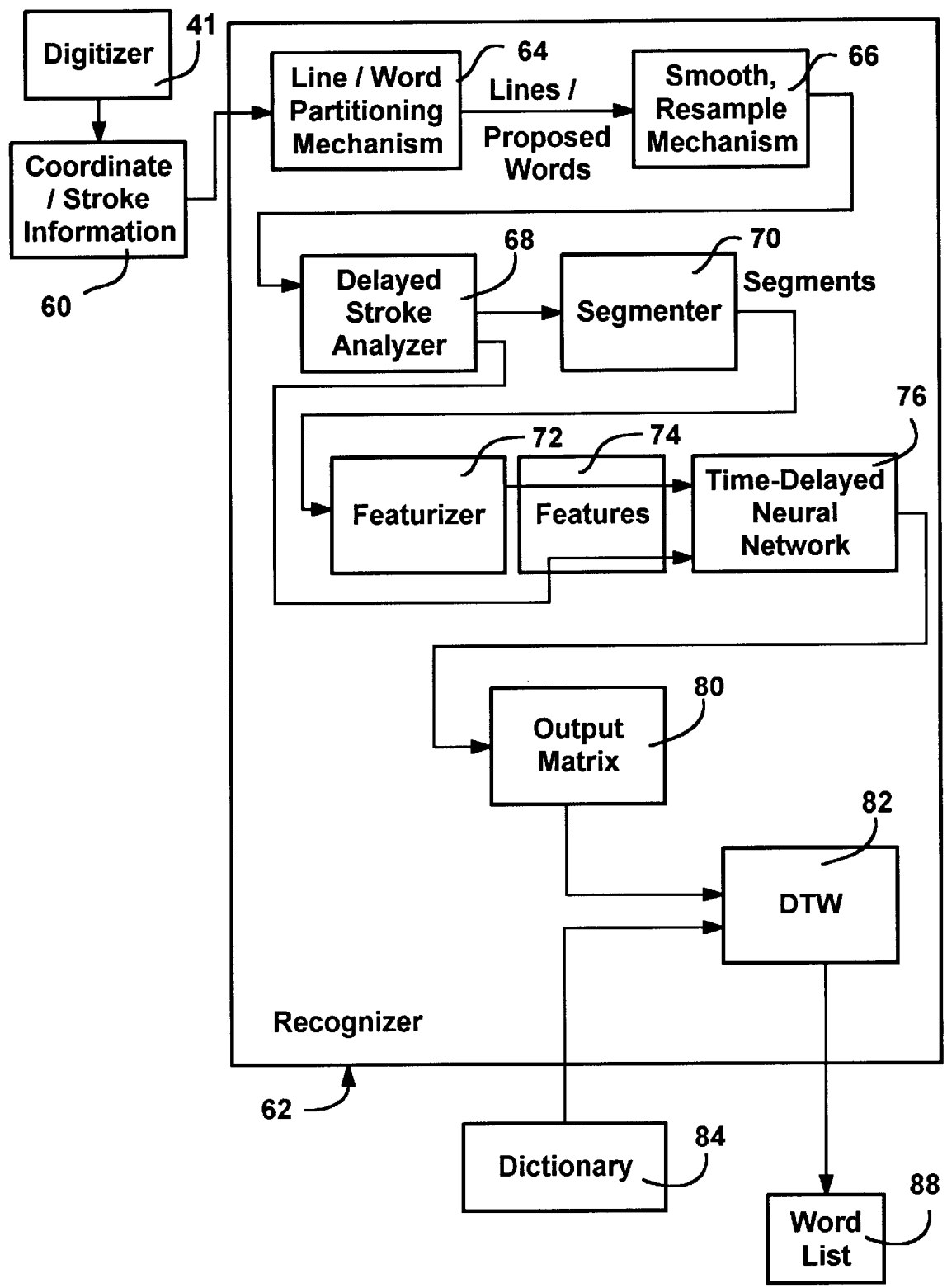
FIG. 2 is a block diagram representing a general recognizer architecture into which the present invention may be incorporated.

In handwriting recognition, ink written by a user is ultimately converted into a string of character codes, such as ASCII or Unicode characters. To this end, a user "writes" electronic ink on the digitizer 41, such as by moving a pen (stylus) across a pad connected to the computer system 20. As can be readily appreciated, the digitizer 41 alternatively may be integrated into a touch-sensitive display, whereby the input ink is typically displayed to the user essentially where it is written. In any event, the digitizer hardware generates points as the pen moves over the x-y coordinates of the digitizer, and the user's writing is collected by the digitizer 41 as a series of strokes in a buffer 60 or the like (FIG. 2). A new stroke is created each time the user puts down the pen (stylus) and subsequently lifts it, and each stroke is thus made up of a series of x and y coordinates representing the points where the pen has traversed the digitizer 41. Digitizers may, for example, resolve values for traversed coordinates on the order of one one-thousandth of an inch.

Figure 3:
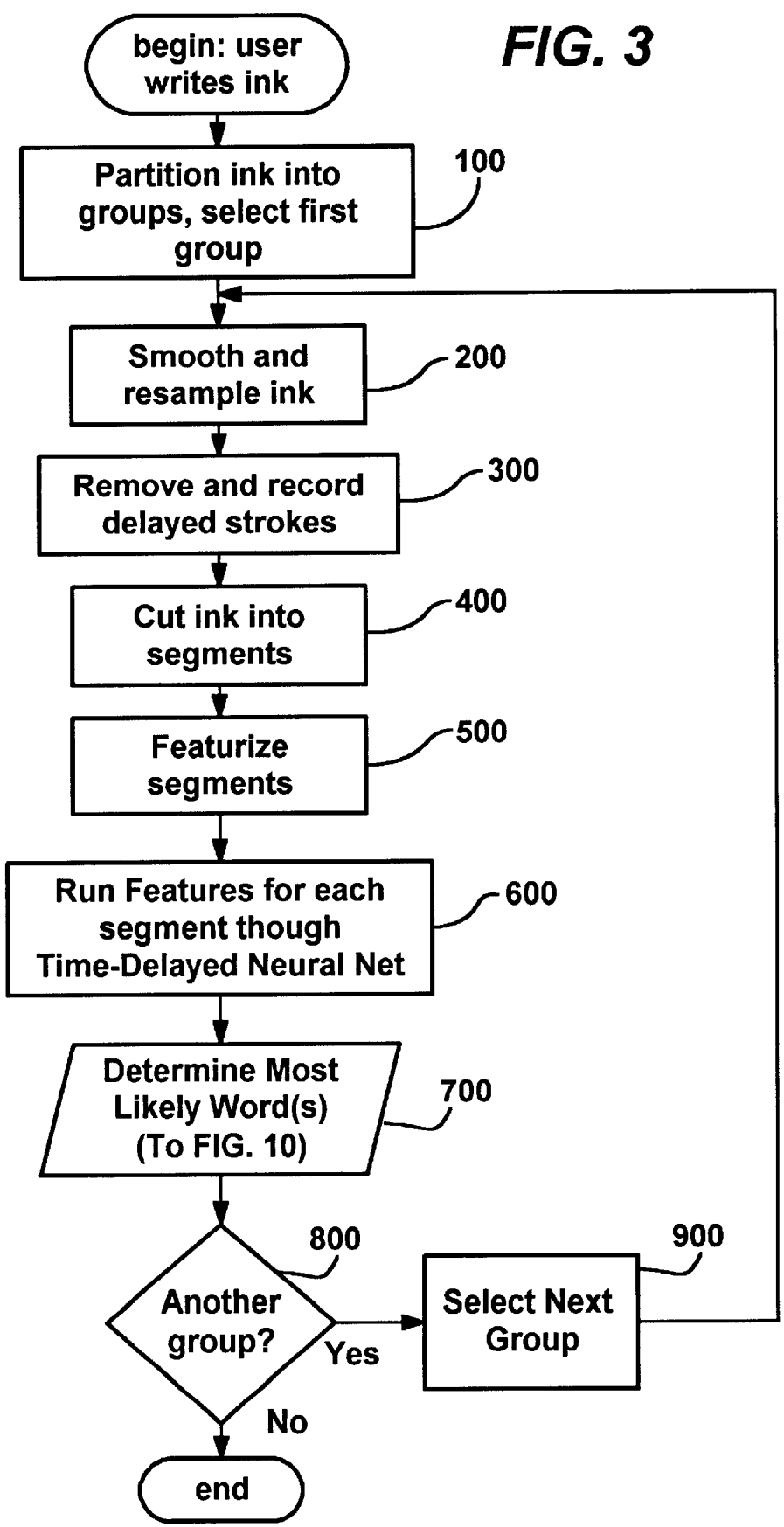
FIG. 3 is a flow diagram representing steps taken by the recognizer to recognize user input information.

In general, the present invention improves the recognition of handwritten or other input information by employing an improved recognizer 62 (FIG. 2) that uses a number of different processes/steps (FIG. 3). Although not all of these processes are necessary to the invention, each has been found to improve overall recognition accuracy to some extent. As described below, improvements in recognition also result from improved training and from an improved neural network architecture.

A first process partitions the ink into groups, via a partitioning mechanism 64 or the like shown in FIG. 2, for example, three user-written lines of digitized ink. The group of ink is fed as a whole to the recognizer, and, as described below, is ordinarily recognized as a series of distinct words.

Alternatively, the ink may be recognized on a per-word basis, whereby the first process partitions the ink into proposed word groupings. If proposed words are used, criteria for dividing the ink into the most likely proposed words may be based on how close together different strokes are in space, as well as time, and whether sufficient white space exists horizontally to separate pieces of ink. For example, a relatively large gap in the x-direction between strokes is typically a good indication of two different words. Note, however, that there is no guarantee that a horizontal gap will exist between handwritten words, e.g., the descending portion of a lowercase handwritten "g" character beginning one word may be partially underneath the last character of the preceding word. Thus, another way in which potential words may be separated is to look for a relatively long duration between pen-up and pen-down times, which tends to suggest a user-intended separation. Moreover, an examination of the ink may be made to determine whether and how strokes overlap each other in the x-direction, y-direction or both, to determine how ink may be grouped into proposed words. Note that this per-word alternative is generally slower than feeding the ink to the recognizer as a group of one or more lines of ink.

Figure 4:
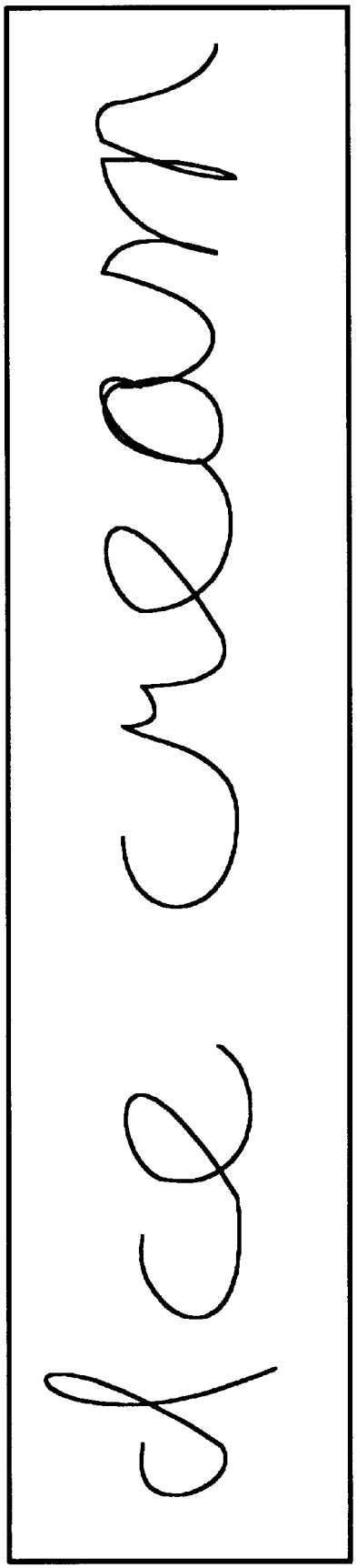
FIG. 4 is a representation of a sample user input and possible word groupings partitioned therefrom.
Figure 4:
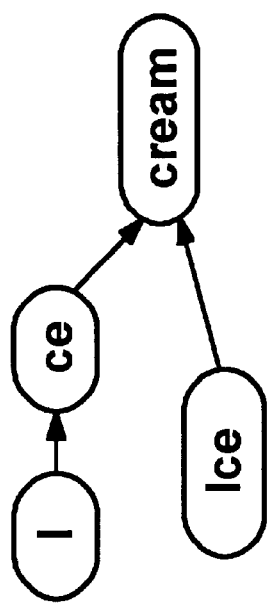

Many times there may be no one certain word grouping. For example, as represented in the handwriting and corresponding possible word groupings in FIG. 4, the user may have written "Ice cream" (two words) or "I ce cream" (three words) and thus each word group needs to be analyzed. Note that to a human reader of the English language it is readily apparent (to a high degree of probability) in FIG. 4 what the user has intended to write, however at this time the computer has only x-y coordinate and stroke information to derive the groupings. Note also that instead of handwritten words, FIG. 4 may represent the phoneme information for sounds, such that when output on an audio device, a person would hear "Ice cream," or "I" "sss" "cream" and so on. However, such breaks in time are generally not needed for speech recognition, as spoken words typically tend to run together with naturally occurring pauses.

To ultimately make a determination of what the user has written or said, the partitioned groupings are individually run through subsequent processes, as described below. Whichever grouping gives the highest probability match to a set of words according to a language model and a neural network model becomes the chosen separation of the ink into words. When lines of words are used, the recognizer factors in the probabilities of spaces between words, i.e., the space character is one possible output like other possible letters. Alternatively, when proposed words are used, (I, ce, Ice and cream in FIG. 4), the stroke or collection of strokes (or phoneme information) that represent that word are sent into the next process to find out what word it is and how likely it is that word. Those words may then be further analyzed in context against a language model, e.g., to determine likely phrases, sentences and so on.

The next process is shown in FIG. 3 by step 200. In step 200, a smooth/resample mechanism 66 (FIG. 2) takes the ink and smoothes and resamples each stroke. Known techniques may be used to regularize the input ink based on its height and width, which substantially reduces or even eliminates some of the variability that results from writing at different sizes and different speeds. In addition, the smoothing removes jagged edges on the strokes, such as those generated by noise in the hardware readings or slight, possibly involuntary user movements. Also, if the user briefly pauses while writing, the hardware tends to detect a cluster of points around the pen. To smooth such clusters, points that are common within a given radius are treated as a single point.

In accordance with one aspect of the present invention, recognition improvement also arises from a specialized resampling procedure. To this end, instead of selecting sample points on the ink evenly over time, the present invention resamples by separating the ink into sections (segment lengths) and setting the number of points per segment length approximately inversely proportional to the second derivative of the ink over that local area. This places a higher density of sample points in the ink at places where the slope is changing more rapidly. As a result, the curves and cusps are accentuated, such that a featurizer 72 (described below) focuses less on the uninteresting straight portions of the ink, and more on the cusps and curvy sections which are generally more important in distinguishing character shapes.

More particularly, the ink trajectory is first resampled using a fixed distance (D) between successive points. The resultant ink has constant absolute velocity at every point, however the x-velocity and y-velocity varies with time satisfying an equation:

$$(dx/dt)^2 + (dy/dt)^2 = c$$

where c is a constant.

Next, the second derivatives of x and y is computed for each point in the fixed-distance resampled ink. The second derivatives are thus independent of the speed, but do reflect the sharpness of curvature. A quantity, iStepSize, is then computed for each point:

$$a = \text{sqrt}((d^2x/dt^2)^2 + (d^2y/dt^2)^2)$$

$$i = 1/(1+a)$$

$$i\text{StepSize} = i*D/\text{avg}(i).$$

A last step is a normalization, which scales each second-derivative inverse such that the average is the fixed-distance D, described above. The raw ink is then resampled again, this time using the variable-distance iStepSize. Note that such non-linearly spaced resampling may be applicable to speech recognition, since it may help focus on the more interesting and distinctive sound sections.

Once the ink has been smoothed and resampled in this manner, a third process, represented in FIG. 3 by step 300, examines the smoothed ink stroke-by-stroke in the time order that the strokes were input to detect delayed strokes. Delayed strokes are something the user goes backwards in the x-direction to complete, such as the dotting of an "i" or "j" or the crossing of a "t" or "x" character. To this end, a delayed stroke analyzer 68 (FIG. 2) of the recognizer 62 examines how far back and upwards the user went before continuing to write, along with the complexity of what was written. In general, if the user has moved such that a pen-up is followed over time by a pen-down in the negative x-direction, and the user has drawn a relatively simple stroke over existing strokes, then it is likely that the user is dotting an "i" or "j" or crossing a "t" or "x" character. Conversely, if a new stroke is fairly complicated with multiple minima and/or maxima (that exceed a hysteresis threshold), or if the stroke is mostly drawn to the right of the immediately previous stroke, then the ink is likely to be a new stream of characters. Strokes that are determined to be delayed strokes are removed from the input ink stream, and recorded as feature information to later pass to the time-delayed neural network 76, as described below. Note that the delayed stroke analyzer 68 is conservative in labeling a stroke as a delayed stroke, and errs on the side of not recognizing some of the delayed strokes, relying on the neural network training to get any more-questionable characters correct. Further, note that this concept is not an issue in speech recognition, as speech input always moves forward in the x-direction, time.

Figure 5:
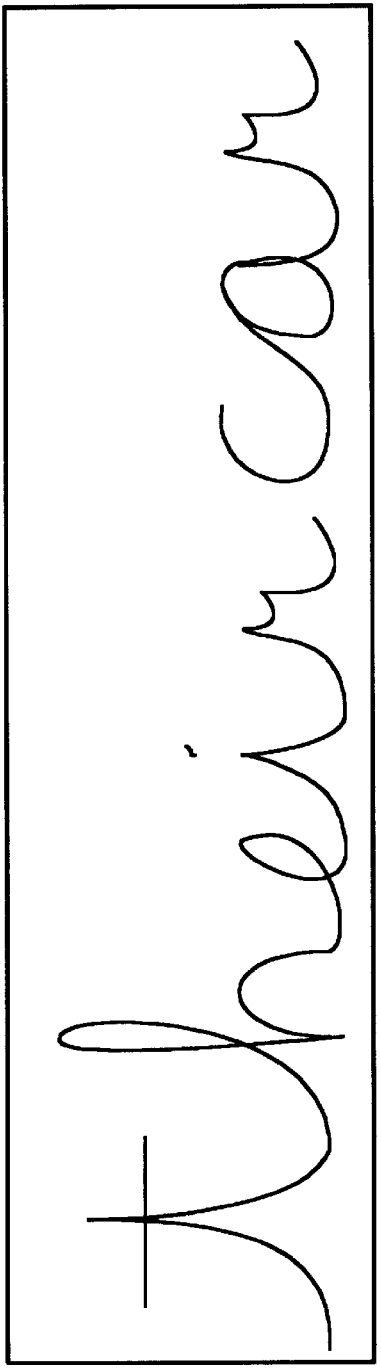
FIG. 5 is a representation of another sample user input.
Figure 6:
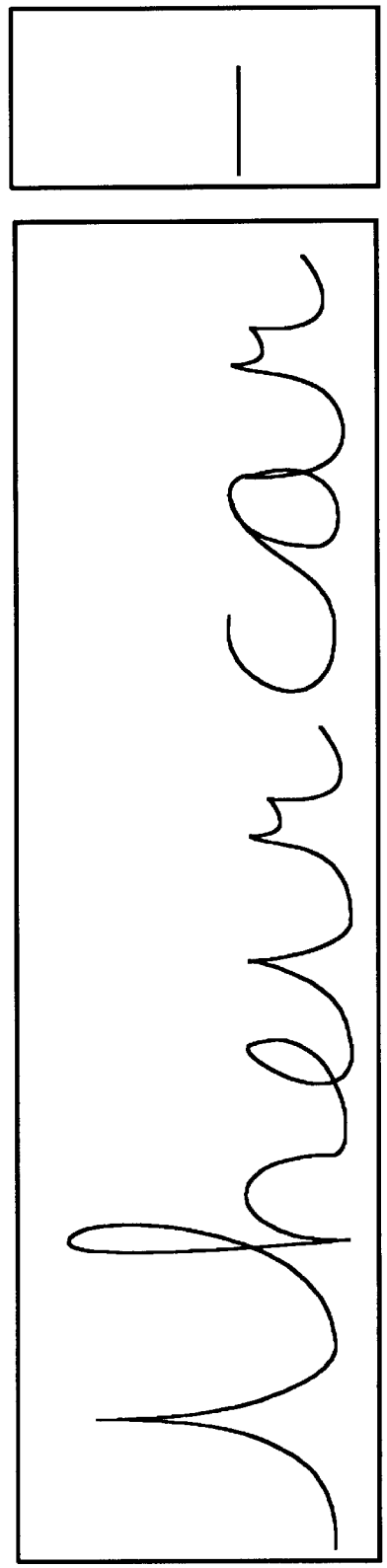
FIG. 6 is a representation of the sample user input of FIG. 5 having delayed strokes removed therefrom.

By way of example, FIGS. 5 and 6 show the how the recognizer 62 has processed a sample thus far. In FIG. 5, the user has input the words "their car" possibly followed by some additional words. For purposes of the present example, only these words are being analyzed, and thus only the word "their" will be the only word having delayed strokes. Note that in the per-word grouping recognition alternative, in the first process 100, "their" is detected as a possible word grouping and sent to the second process 200 for smoothing and resampling. Note that individual sample points are not shown in FIG. 6 for purposes of simplicity and clarity, however it is straightforward to conceive of the ink as being made of points that are more dense around the curves and cusps and less dense on the straight portions. In any event, as generally represented in FIG. 6, the delayed strokes have been removed and recorded as feature information for later use.

Once the delayed strokes have been removed and recorded, a fourth process (represented by the segmenter 70 in FIG. 2 and by step 400 in FIG. 3) cuts the remaining (non-delayed stroke) ink into distinct segments based on the y-minima thereof. In general, each distinct y-minimum causes a new segment, as standard techniques using a hysteresis threshold are used to eliminate false minima over fairly flat areas, or when finding two or more minima in close proximity.

A fifth process 500 (FIG. 3) then featurizes each of these segments into a relatively small number of features 74, i.e., a small number relative to the large number of sample points that typically make up the segment. Features comprise values representative of the various segments' characteristics and properties that are fed as inputs to the time-delayed neural network 76, and may include information such as the absolute size of the segment relative to a baseline, the aspect ratio and the size relative to nearby segments. Preferably, the featurizer 72 (FIG. 2) generates nineteen features for each segment, with one additional feature having a value based on the nearest delayed stroke, for a total of twenty input features per segment. The majority of these twenty features correspond to Chebyshev coefficients, as described in U.S. patent application Ser. No. 09/046,218, entitled "*Feature Extraction for Real-Time Pattern Recognition Using Single Curve Per Pattern Analysis*," assigned to the assignee of the present invention and hereby incorporated by reference in its entirety. As described therein, groups of points (e.g., that represent segmented characters) may be transformed into respective sets of coefficients of Chebyshev polynomials. The time-delayed neural network 76 uses these coefficients as features to identify characters by their shape and other characteristics.

Figure 7:
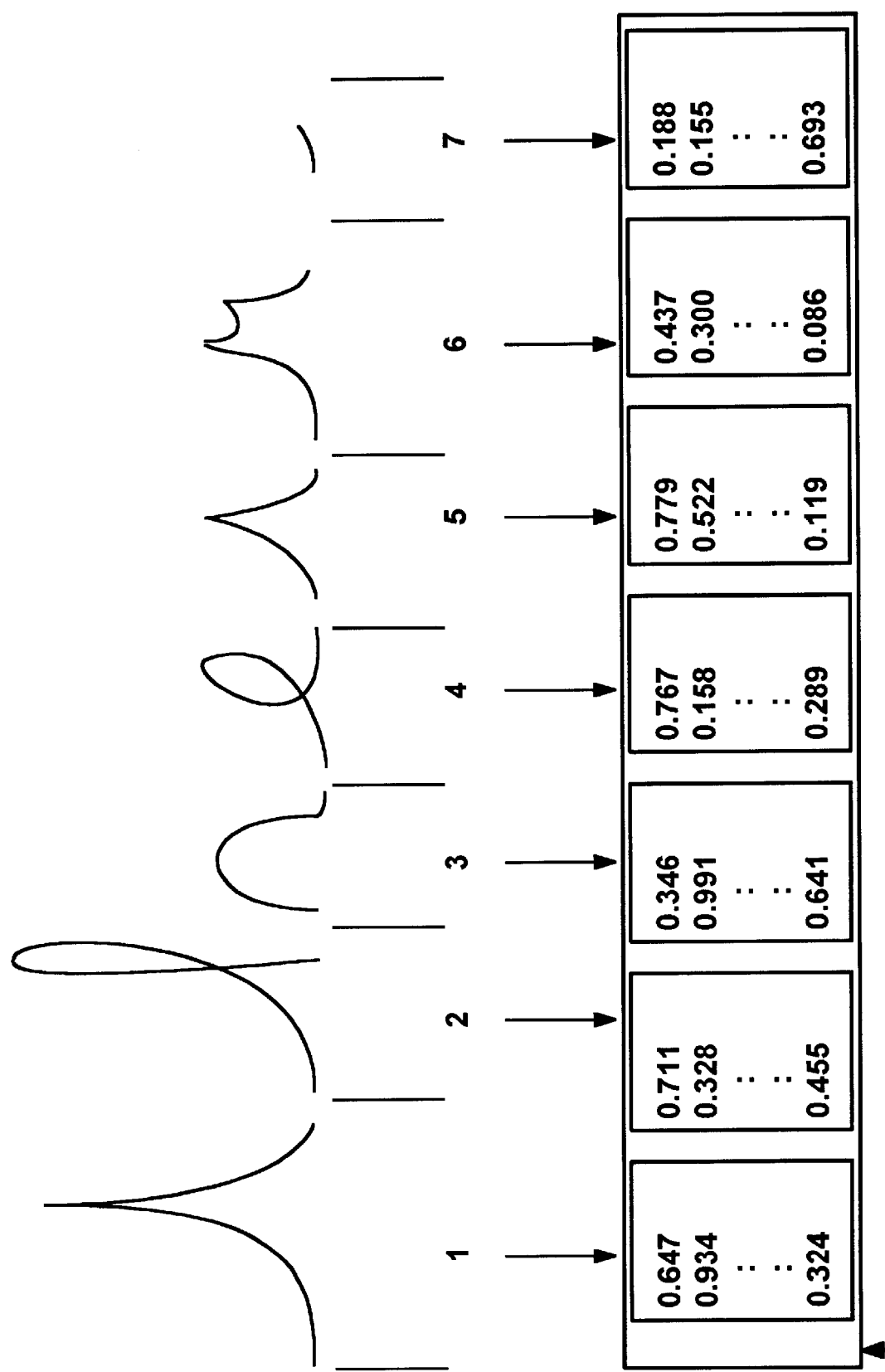
FIG. 7 is a representation of the sample user input of FIG. 6 showing the segmenting and featurizing steps.

FIG. 7 represents part of the sample having undergone the segmentation and featurization processes, (steps 400 and 500 respectively in FIG. 3), wherein the ink has been cut into seven segments, and each segment has been transformed into a number of features 76 (e.g., twenty). Note that the values of the features shown in FIG. 7 are for purposes of illustration only, and are not actual feature values derived from actual segmented ink. Moreover, feature values for the space following the word "their" are also determined, as shown by an eighth set of features in FIG. 8.

Figure 8:
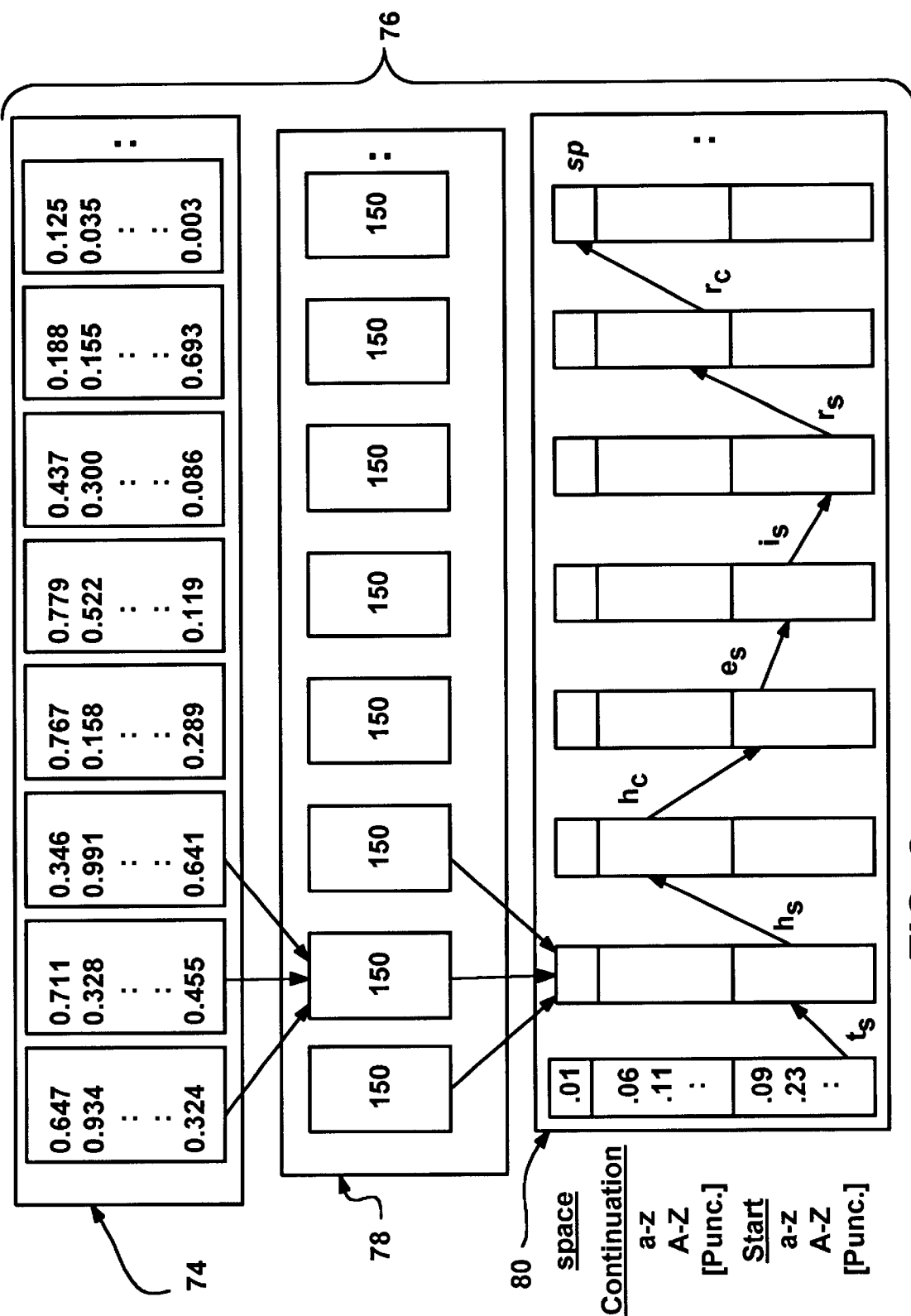
FIG. 8 is a representation of a time-delayed neural network having the features of FIG. 7 input as its input layer, a hidden layer and an output layer comprising a matrix in accordance with one aspect of the present invention.
Figure 9:
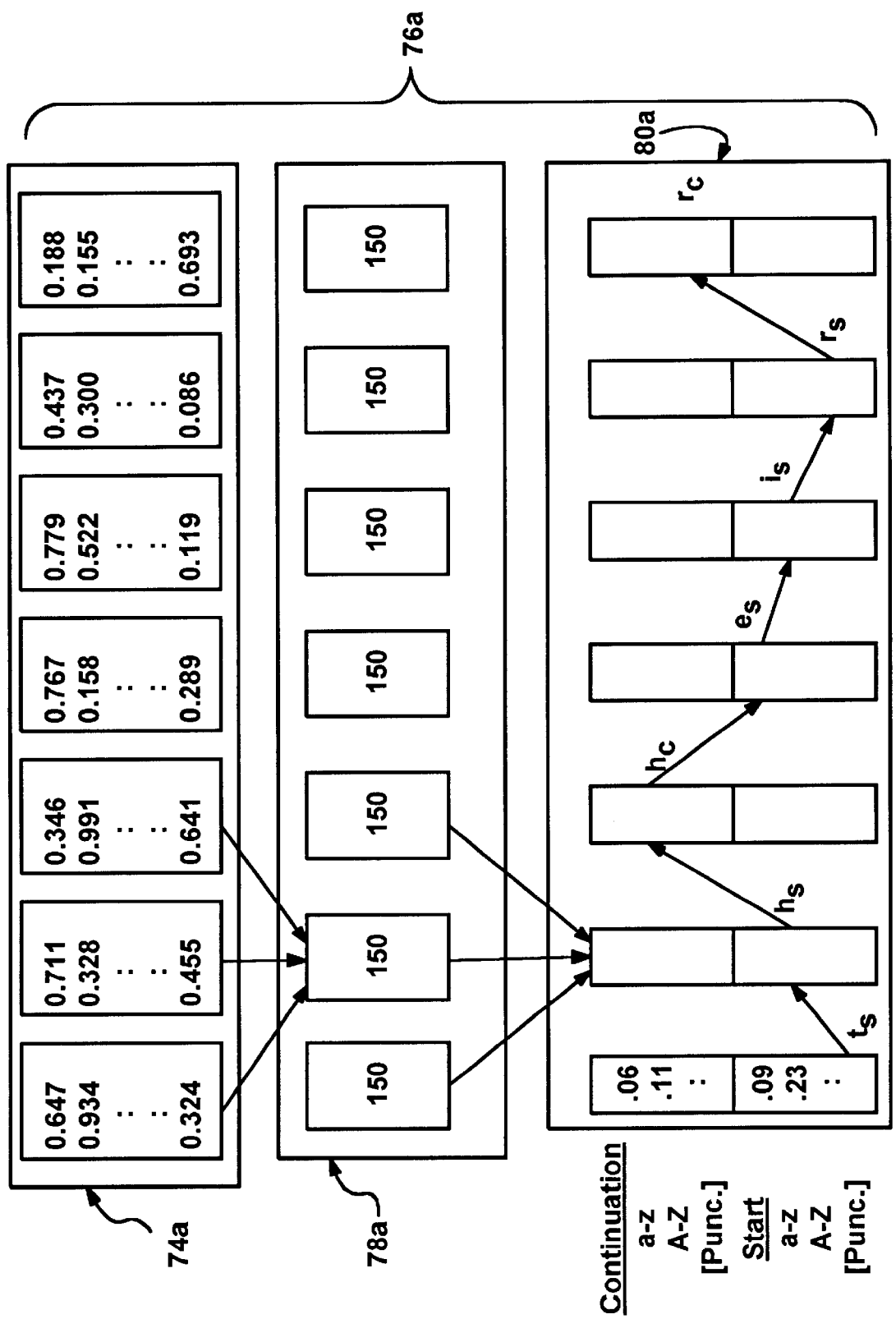
FIG. 9 is a representation of an alternative time-delayed neural network having the features of FIG. 7 input as its input layer, a hidden layer and an output layer comprising a matrix without space character output.

A sixth process, step 600 in FIG. 3, runs each of the segments through the time-delayed neural network 76 (FIG. 2). As represented in FIG. 8, for each segment, the time-delayed neural network 76 takes the twenty features for that segment, and the features from one or more other segments (preferably the adjacent segment or segments), as its inputs, (i.e., the input layer). Note that where one or more lines of ink are sent to the recognizer, there are feature values for the spaces between words and for the segments of other words, i.e., the ink is fed as a whole to the recognizer, and the spaces can be considered segments. In the alternative, wherein each group of ink is a proposed word, only the segments for a proposed word are fed to the neural network 76a, as shown in FIG. 9, i.e., a space is not considered another segment. In any event, as is known in neural networking, from these features, along with interaction weights therebetween determined during training, the neural network 76 generates a number of values (e.g., one-hundred and fifty) in its hidden layer 78. Character scores are then output for each possible character based on the weighted interaction of the values in the hidden layer, again according to the training. As shown in FIG. 8, the output is recorded in an output matrix 80 of probabilities (or costs), wherein the y-axis represents letter output scores for the space character and various letters A–Z, a–z and optionally punctuation symbols, while the x-azis represents the segments as drawn in time. In the alternative neural network 76a of FIG. 9, features for the space are not input, and the output matrix 80a has no output for a space character.

Figure 10:
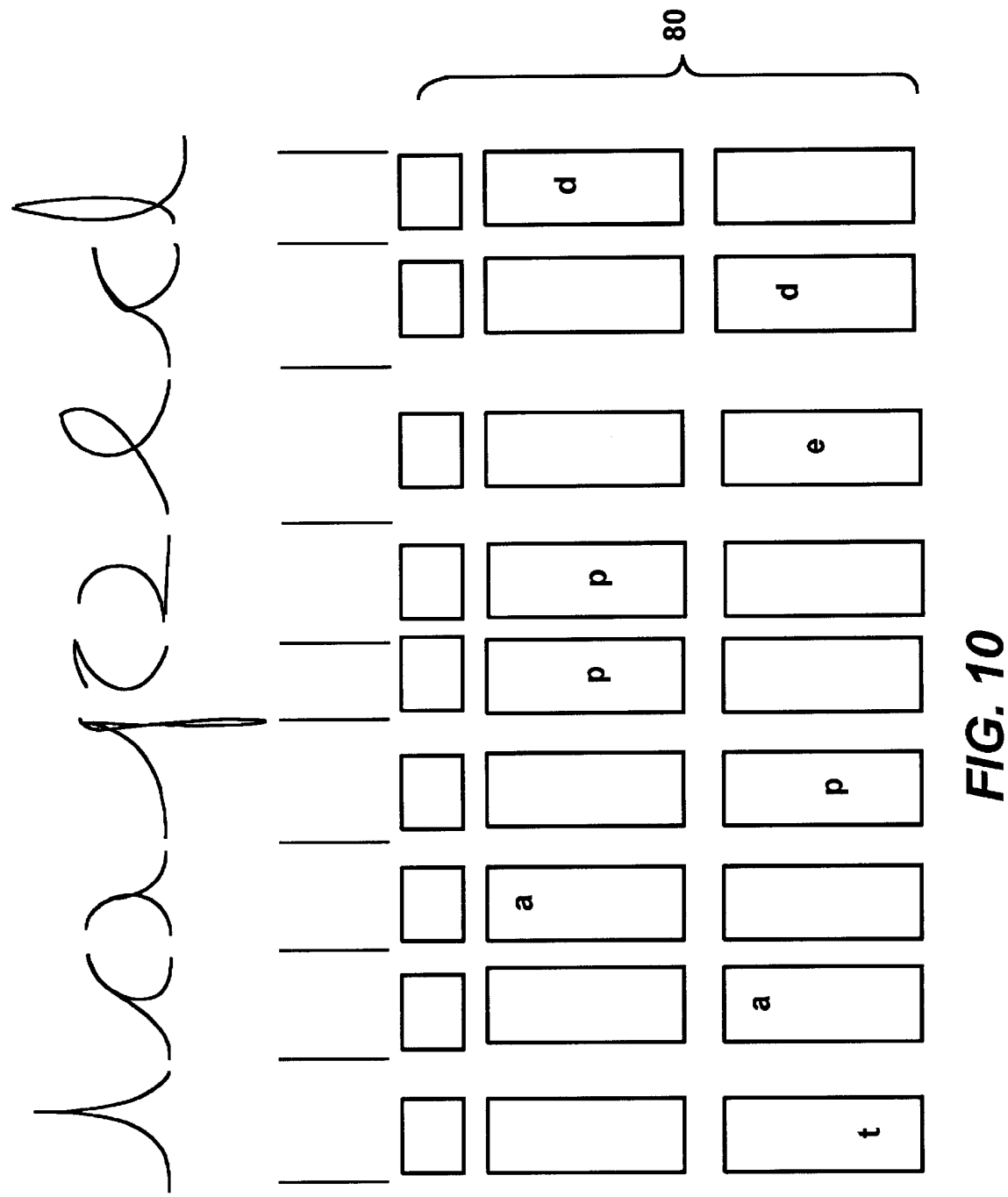
FIG. 10 is a representation of another sample user input having starting and continuation characters output therefor by the neural network in accordance with one aspect of the present invention.

In accordance with one aspect of the present invention and as shown in FIG. 8, the time-delayed neural network 76 has an architecture via which the output matrix 80 comprises separate scores for the start and continuation of a character. This eliminates confusion that arises in typical architectures having only one output node per letter, namely whether successive outputs are for the same character continuing or are for the same character appearing repeated in the word. For example, consider the word "taped" as shown segmented in FIG. 10. With only one output node per letter (i.e., without the present invention's distinct scores for starting and finishing), one combination of y-minimized segments that would have a reasonably high probability (low cost) would read "taapppedd." While the dictionary would handle the double-a and the double-d, it would be unable to distinguish between "taped" and "tapped" since both are valid words. Note that the letter "p" may be written such that it is contained in a single y-minimized segment, such as by slanting the handwriting to the left, (so that the lower portion of the "p" was the right minima), or such that it is spans two or more segments. However, since only one starting "p" would have a high probability, the present invention properly detects that only one "p" has been written. Note that the arrows in the matrix 80 of FIG. 8 are intended to represent one high probability path for the segmented word "their" including the subsequent space character of FIG. 7).

Once the output matrix 80 is obtained, it is used to find the best words (or a ranked list of the best words) based on the lowest cost path or paths therethrough. One way to find such a path is to simply run a dynamic algorithm such as the Viterbi algorithm through each of the paths and determine the lowest cost path that was output. As is known, this technique may be sped up tracking the lowest cost and abandoning paths that exceed the cost. Such a technique is useful when inputting strings of characters that are not ordinary dictionary words, such as a list of names, strings of numbers and so on.

However, when primarily recognizing dictionary words, it is fast and accurate to select each word in the dictionary, and then run a dynamic time warp (DTW) 82 to find the most probable path through the output matrix 80 for that word. Then, the score for each word may be compared with the scores of other words to find the best word or words. Note that searching for the least expensive word in this manner is greatly sped up by using a trie structured dictionary 84 (FIG. 2) so that the cost of each common prefix is only computed once, whereby only the ending letters that are different need their costs recomputed. Also, thresholding the search against the score for the best word found up to that point prevents searches down futile paths, while searching down the most likely paths first can also significantly speed the search.

Figure 11:
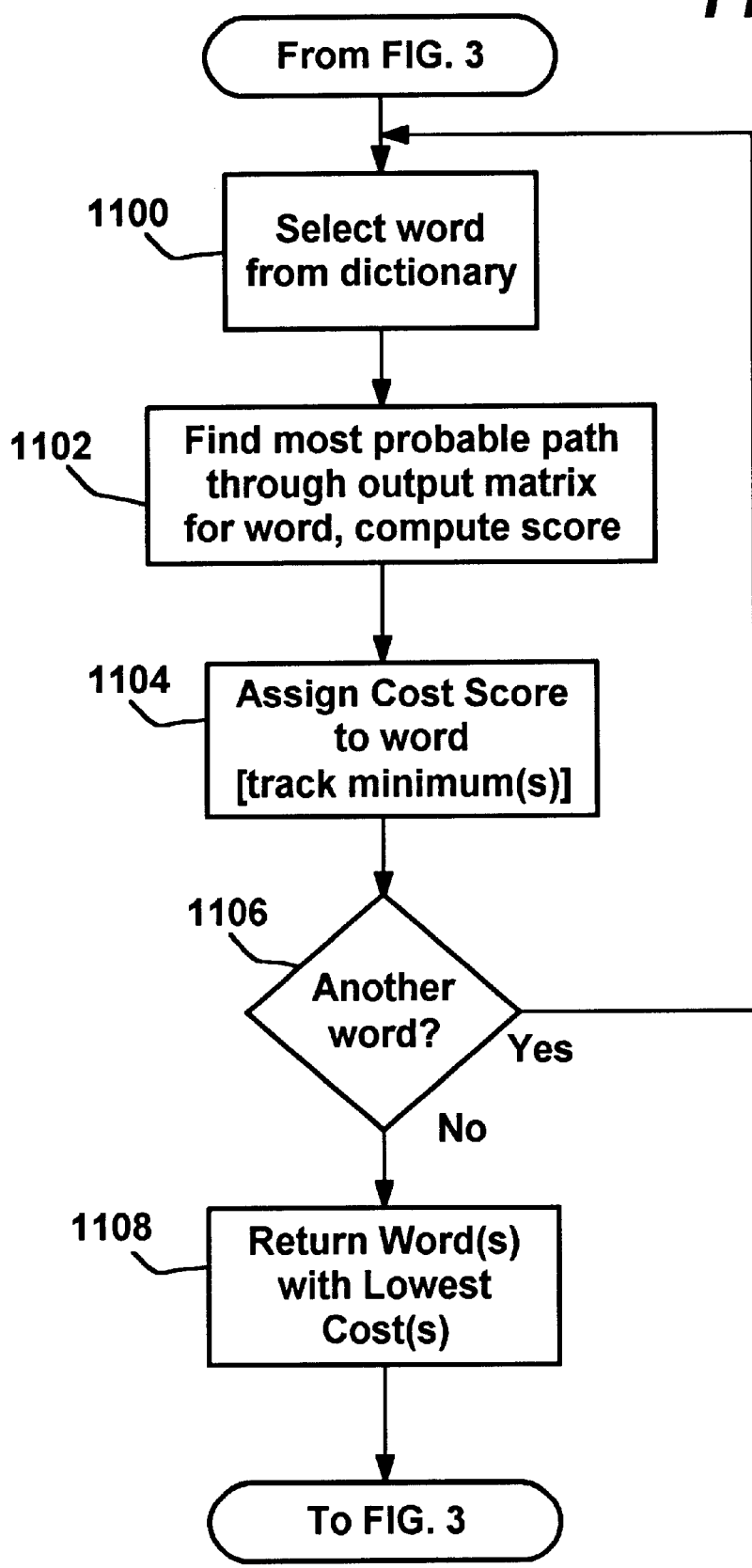
FIG. 11 is a flow diagram generally representing how the most probable word (or words) in a dictionary is selected from the output matrix.
Figure 12:
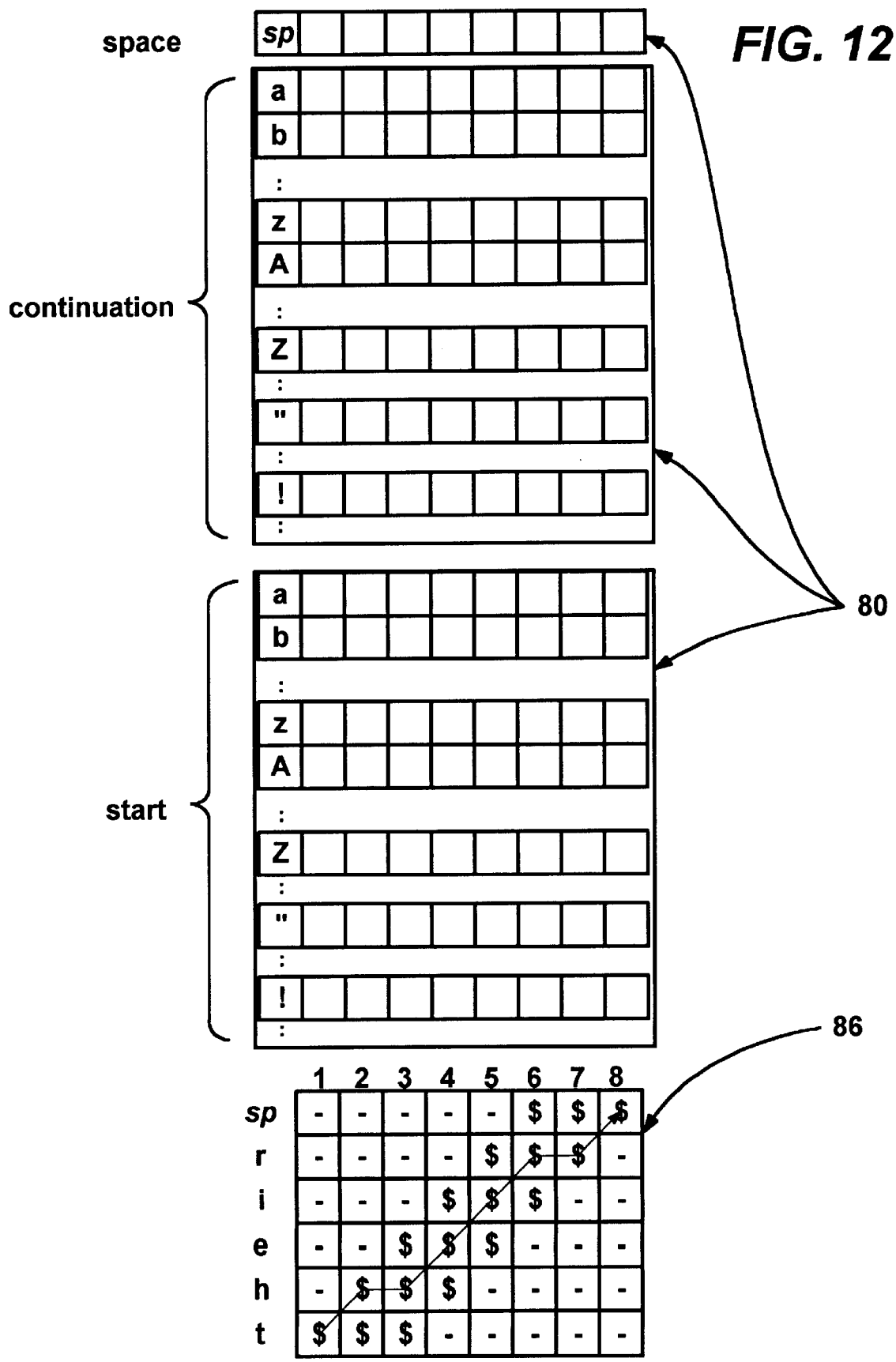
FIG. 12 is a representation of the output matrix of the neural network being used to compute costs in a DTW matrix for finding the lowest cost path therethrough in accordance with one aspect of the present invention.
Figure 13:
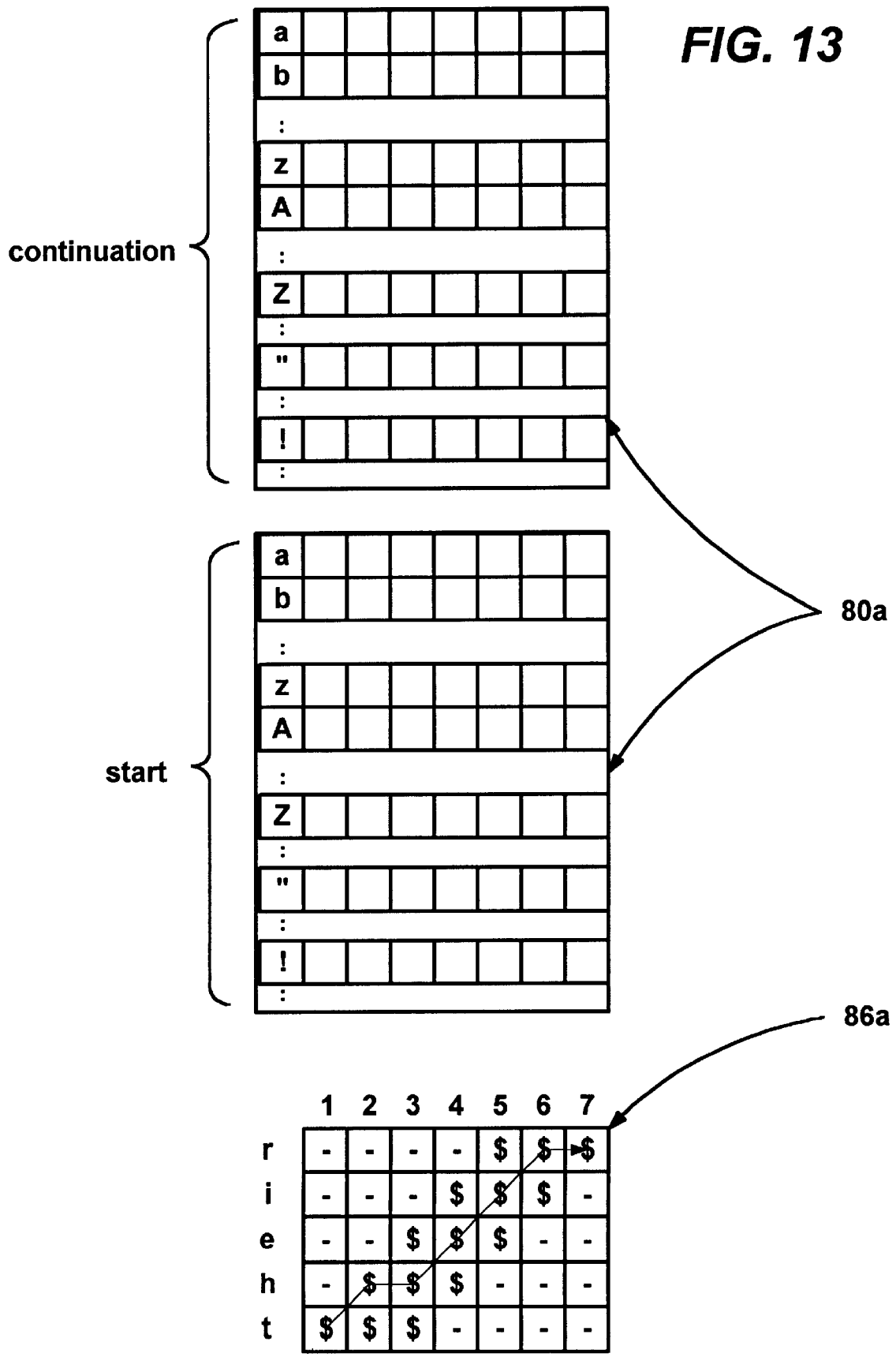
FIG. 13 is a representation of the alternative output matrix of the neural network, without space character output, being used to compute costs in a DTW matrix for finding the lowest cost path therethrough in accordance with another aspect of the present invention.

FIG. 11 shows the steps taken to perform the DTW on the dictionary words, beginning at step 1100 where the first word is selected from the dictionary 84 (FIG. 2). Note that the words need not be selected in alphabetic order, but instead may be selected according to some other order, such as based on lexical frequency, (words are more likely to begin with "s" than "q"). One preferred way is to start the search with words that begin with the highest probability (lowest cost) that the neural network has assigned to the first starting character in the output matrix. In any event, once a word is selected, it is placed in a cost computation matrix 86, with its first character at the bottom left and its last character at the top left. FIG. 12 shows the word "their" (including a trailing space) in such a matrix 86, along with the output matrix 80. Note that many other words may have already had their costs computed prior to "their" being the word selected from the dictionary at step 1100. FIG. 13 shows the alternative, per word recognizer, which does not include the trailing space.

At step 1102, the most probable path through the output matrix 80 is computed for the selected word. Each word is assigned a score based on the least costly path that can be traversed through the output matrix 80 therefor. For the selected word, the cost of starting the word is initialized to the cost assigned by the time-delayed neural network 76 to the first letter of that word. For example, for words beginning with an "o" character, it can be readily appreciated that the neural network 76 will have a high initial cost, since the first segment has few characteristics of an "o." Words beginning with "b," "h," "l" and "t" will have a much lower cost. Indeed, the cost of certain starting characters may be high enough relative to a threshold that words beginning with those characters need not selected until later, if at all.

After the initial word cost, the cost (represented by the "$" in FIG. 12) of the cells in the computational matrix 86 are filled in according to the following rule. Moving to the right in the computational matrix 86 equals the current cost plus the cost that the neural network 76 assigned to the continuation of the letter. Moving to the right and up is the cumulative cost of the current cell plus the cost the neural network 76 assigned for the start of the new letter represented by that row. Thus, for example, the cost in cell t1 is the "t" start cost, while the cost placed in the cell to the right of the "t" character (cell "t2") is the cost the neural network 76 assigned to "t" starting in segment one plus the cost the neural network 76 assigned to the "t" continuation in segment two. The next cell to the right ("t3" ) is the cost in cell "t1" plus the cost of the "t" continuation in segment three, and so on. The cost for cell "h2" is the cost of "t1" start plus "h" start in the output matrix 80 in segment two, while the cost of cell "h3" is the cost of "h2" plus the cost of "h" continued in the third output segment. Note that the computational matrix 86 need not be entirely filled in, since for example, in the word "their" the "t" can occupy at most the first three of the eight segments, (counting the space segment), since at least five segments are needed for the remaining "heir" part. Similarly, the space character may only occupy one of the final three segments. The "–"

character in FIG. 12 shows the cells that do not have costs computed therefor.

Once the matrix 86 is filled in, the computation of the best cost therein is done by starting at the bottom row (corresponding to the "t" in "their" in the present example) and running left to right, and then up. For each cell, the cost is computed by taking the minimum of either the cost of transitioning from the cell neighbor to the immediate left (if any) or the cost of transitioning from the cell neighbor to the left and down one row (if any). For the bottom row, the initial cell has a cost equal to the starting cost assigned for the first letter of the word, and for cells to the right, there are only cells to the immediate left to consider. For a cell such as "h3," the selected path is the minimum cost of transitioning from either "h2" or from "t2." The least costly path through the possible segments that make up the selected word is then known, as represented by the arrow through the DTW matrix 86 in FIG. 12. Similarly, in the alternative per-word recognizer of FIG. 13, the least costly path is represented by the arrow through the DTW matrix 86a.

Step 1104 of FIG. 11 associates the computed score of the lowest cost path with a word representing the ink. Preferably, as the scores for the selected words are computed, one or more minimum costs are tracked, and words with higher costs are discarded. The number that is tracked depends on how many words and their costs are to be returned, e.g., the ten lowest are tracked if ten are to be returned. Step 1106 repeats the process until there are no more words in the dictionary. Lastly, step 1108 returns the word or words from the recognizer 62 in a list 88 (FIG. 2). For example in the ink of FIG. 5, the recognizer might return "their" with a high score, "thus" with a lower score and so on for a first possible word, "car" with a high score for a second word, "can" with a lower score, and so on.

Returning to FIG. 3, steps 800 and 900 repeat the process for the next set of lines, or alternatively, for each of the proposed word groups. At an appropriate time, the returned words may be put together with the words comprising the most probable word combination based on their scores and a language model. Thus, although in FIG. 4 "I" would have a high score, "ce" would not, (it would not be a valid word in most dictionaries), and thus "Ice" would likely be the best word. The word "Ice" (and also "I" and "ce") may also be considered in context with the following best words, such as "dream" or "cream," whereby "cream" would be selected as the best choice following "Ice."

Training The Time-Delayed Neural Network

In accordance with another aspect of the present invention, training is done at the word level, in essentially the same manner as described above for recognition. Unlike previously known training methods, the training method of the present invention takes advantage of the letter ordering and properly handles letters that occur multiple times by enforcing the correct number of letters and the correct order thereof.

Figure 14:
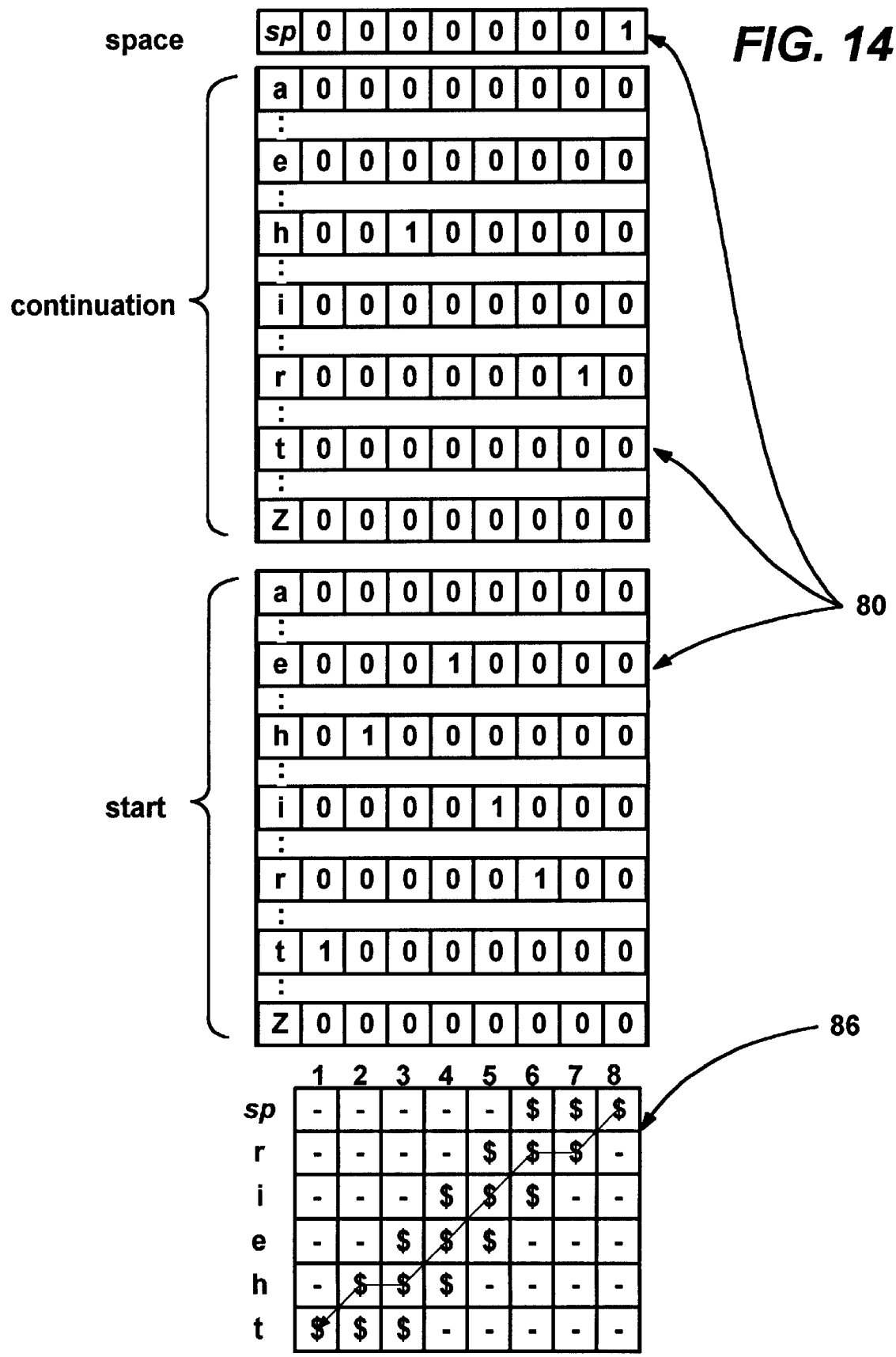
FIG. 14 is a representation of the output matrix of the neural network being filled in with values at train time based on path information computed in a DTW matrix for a labeled word.

To this end, the neural network 76 is initially started with random weights. Then, the ink for a group of words is taken, featurized and run through the neural network 76 (as described above) at that point. Since the correct labels for the words are known, the words are put into a DTW computational matrix 86 just as at recognition time, as described above, recording the path backwards taken at each cell. Note that if the matrix does not accommodate space characters, then the training is done on one word at a time. In any event, next, as shown in FIG. 14, the cell in the upper right corner of the matrix 86 is followed backwards to find the optimal path therethrough. For every neural network output that corresponds to the path, a target of one (high probability) is set in the output matrix 80, and the neural network output is set to zero (low probability) everywhere else. Not only does this adjust the weights in accordance with the actual feature values, but significantly, words may be used rather than having to label each segment with character data, which in practice enables a far greater number of samples to be used to rapidly train the neural network with minimal human intervention. Indeed, with the use of a DTW at train time to provide improved training, the improved pre-processing and the improved neural network architecture of the present invention, actual recognition errors have dropped to below seven percent.

Lastly, the present invention may be used for speech recognition as mentioned above. To this end, every word in a dictionary may be made up of a phoneme spelling. As with distinguishing starts and continuations of letters in handwriting recognition, in speech recognition, each segment of speech is classified as either the start of a new phoneme or the continuation of a phoneme. Speech recognition occurs by finding the most likely sequence of phoneme starts and continuations that make up the most likely sequence of valid words when combined with scores from a language model.

As can be seen from the foregoing detailed description, there is provided a method and system that provide improved recognition accuracy of user input data comprising handwriting or speech data, via improvements in training of an improved neural network architecture, along with improved preprocessing of the input data. The training and recognition employ a DTW in conjunction with a neural network having separate outputs for the start and the continuation of characters.

While the invention is susceptible to various modifications and alternative constructions, a certain illustrated embodiment thereof is shown in the drawings and has been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. A method for recognizing user input data, comprising:
   segmenting the user input data into a plurality of segments;
   for each segment, inputting segment information corresponding to the user input data into a neural network, the neural network outputting, for each character of a plurality of possible characters, a first score corresponding to a probability that the segment information represents the start of the character and a second score corresponding to a probability that the segment information represents the continuation of the character from a previous segment;
   generating an output matrix from first and second sets of scores for the plurality of segments; and
   using the first and second sets of scores in the matrix for the segments to determine paths therethrough corresponding to words and scores for the words, and returning at least one word based on a determined score thereof.

2. The method of claim 1 wherein the user input data is phoneme information representing speech.

3. The method of claim 1 further comprising partitioning the user data into proposed words.

4. The method of claim 1 wherein the output matrix further includes at least one set of scores for a space character.

5. The method of claim 1 further comprising smoothing the user data.

6. The method of claim 1 further comprising resampling the user data.

7. The method of claim 5 wherein resampling the user data comprises separating the input data into a number of sections, and selecting a number of sample points to represent the input data in each section based on the second derivative of the input data in that section.

8. The method of claim 1 further comprising featurizing the user input data into feature values.

9. The method of claim 8 wherein inputting segment information corresponding to the user input data into the neural network includes inputting the feature values into the neural network.

10. The method of claim 8 wherein featurizing the user input data into feature values includes identifying delayed strokes.

11. The method of claim 1 wherein the user input data is electronic ink representing cursive handwriting.

12. The method of claim 11 wherein segmenting the user input data into a plurality of segments includes segmenting electronic ink information into distinct segments based on the y-coordinate minima thereof.

13. The method of claim 12 further comprising featurizing the electronic ink information for each segment based on characteristics thereof.

14. The method of claim 13 wherein the ink is featurized into a number of feature values including values based on coefficients of a Chebyshev polynomial representing ink information in the segment.

15. The method of claim 13 wherein inputting segment information corresponding to the user input data into the neural network includes inputting the feature values into the neural network.

16. The method of claim 1 wherein using the first and second sets of scores comprises, finding a path through the first and second sets of scores for the segments corresponding to a lowest cost.

17. The method of claim 1 wherein using the first and second sets of scores comprises, selecting a word from a dictionary, and determining a path through the first and second sets of scores for the segments corresponding to a lowest cost for the word.

18. The method of claim 17 further comprising assigning a score to the word based on the lowest cost path through the first and second sets of scores for the segments.

19. The method of claim 1 wherein using the first and second sets of scores comprises, selecting words from a dictionary, determining a path through the first and second sets of scores for the segments corresponding to a lowest cost for each word, assigning a score to each word based on the lowest cost path through the first and second sets of scores for the segments for that word, and returning at least one word based on the score assigned thereto relative to the scores assigned to other words.

20. The method of claim 1 wherein inputting segment information comprises inputting a plurality of segmented words into the neural network, and wherein returning at least one word comprises returning a plurality of words.

21. A computer-readable medium having computer-executable instructions for performing the method of claim 1.

22. The method of claim 1 wherein the output matrix is generated by the neural network.

23. The method of claim 1 wherein using the first and second sets of scores comprises, mathematically combining at least some of the first and second sets of scores for one segment with at least some of the first and second sets of scores for another segment.

24. A method for training a neural network to convert user input to strings of characters, comprising, setting the neural network with initially random weights, receiving ink for at least one sample word, each sample word having a word label associated therewith, featurizing the ink into a number of features values, inputting the feature values into the neural network, computing a dynamic time warp matrix for each word based on the characters in its word label, finding an optimal path back through the dynamic time warp matrix, and setting the neural network output to a first value for each output that corresponds to the path and to a second value for each output that does not correspond to the path, the neural network output including character start and character continuation values.

25. A computer-readable medium having computer-executable instructions for performing the method of claim 24.

26. A system for recognizing user input data, comprising:
a neural network configured to receive information corresponding to segments of user input data and to output scores for a plurality of possible characters for each segment, including for each possible character a first score corresponding to a probability that the information of that segment represents the start of the character and a second score corresponding to a probability that the information of that segment represents the continuation of the character from a previous segment;
an output matrix of the scores for the segments; and
a mechanism that uses the output matrix to determine paths therethrough corresponding to words and scores for the words, and returns at least one word based on the determined score thereof.

27. The system of claim 26 wherein the mechanism that uses the output matrix comprises a dynamic time warp.

28. The system of claim 26 wherein the user input data is phoneme information representing speech.

29. The system of claim 26 wherein the user input data comprises a plurality of words.

30. The system of claim 26 wherein the output matrix includes at least one set of scores for a space character.

31. The system of claim 26 further comprising a mechanism for smoothing the user data and a mechanism for resampling the user data.

32. The system of claim 31 wherein the mechanism for resampling the user data comprises means for separating the input data into the segments, and for selecting a number of sample points to represent the input data in each segment based on the second derivative of the input data in that segment.

33. The system of claim 26 further comprising a mechanism for segmenting the user input data into the segments, and a mechanism for featurizing the user input data into feature values.

34. The system of claim 33 wherein the information received by the neural network includes the feature values.

35. The system of claim 26 further comprising a dictionary, wherein the mechanism that uses the output matrix selects a word from the dictionary, and determines a path through the output matrix corresponding to a lowest cost for the word.

36. The system of claim 26 wherein the mechanism that uses the output matrix mathematically combines at least one score in the first and second sets of scores for one segment with at least one score in the first and second sets of scores for another segment.

* * * * *

UNITED STATES PATENT AND TRADEMARK OFFICE
CERTIFICATE OF CORRECTION

PATENT NO. : 6,393,395 B1
DATED : May 21, 2002
INVENTOR(S) : Guha et al.

It is certified that error appears in the above-identified patent and that said Letters Patent is hereby corrected as shown below:

Column 7,
Line 24, "is computed" should read -- are computed --.

Column 9,
Line 51, "FIG. 7)." should read -- FIG. 7. --.

Signed and Sealed this

Twenty-third Day of November, 2004

JON W. DUDAS
*Director of the United States Patent and Trademark Office*